United States Patent
Vanden Eynden

(10) Patent No.: US 7,445,363 B2
(45) Date of Patent: Nov. 4, 2008

(54) SELF-STANDING REFLECTOR FOR A LUMINAIRE

(75) Inventor: James G. Vanden Eynden, Hamilton, OH (US)

(73) Assignee: LSI Industries, Inc., Cincinnati, OH (US)

( * ) Notice: Subject to any disclaimer, the term of this patent is extended or adjusted under 35 U.S.C. 154(b) by 37 days.

(21) Appl. No.: 11/536,308

(22) Filed: Sep. 28, 2006

(65) Prior Publication Data

US 2007/0070633 A1  Mar. 29, 2007

Related U.S. Application Data

(60) Provisional application No. 60/721,625, filed on Sep. 29, 2005.

(51) Int. Cl.
*F21V 7/00* (2006.01)

(52) U.S. Cl. .................. 362/346; 362/297; 362/292; 362/350

(58) Field of Classification Search .......... 362/297, 362/292, 346, 350, 303
See application file for complete search history.

(56) References Cited

U.S. PATENT DOCUMENTS

| | | | |
|---|---|---|---|
| 1,654,974 A * | 1/1928 | Johnson ................. 362/292 |
| 4,358,816 A | 11/1982 | Soileau |
| D281,355 S | 11/1985 | Fraley et al. |
| 4,694,382 A | 9/1987 | Sales |
| 4,789,923 A | 12/1988 | Sales |
| 4,799,136 A | 1/1989 | Molnar |
| 5,938,317 A * | 8/1999 | Thornton ................. 362/290 |
| D425,652 S | 5/2000 | Brok |
| 6,190,023 B1 * | 2/2001 | Leadford et al. ........... 362/303 |
| 6,203,176 B1 * | 3/2001 | Gordin ................. 362/350 |
| D447,272 S | 8/2001 | Smith |
| 6,338,564 B1 * | 1/2002 | Jordan et al. ............ 362/346 |
| 6,382,803 B1 | 5/2002 | Arumugasaamy |
| 6,464,378 B1 | 10/2002 | Reed et al. |
| D469,564 S | 1/2003 | Brok |
| 6,508,574 B1 * | 1/2003 | Sara et al. ............ 362/297 |
| 6,582,101 B2 | 6/2003 | Sara et al. |
| 6,722,777 B2 | 4/2004 | Erber |
| 7,008,079 B2 | 3/2006 | Smith |
| 7,128,446 B2 | 10/2006 | Vanden Eynden |
| 7,213,948 B2 | 5/2007 | Hein |

* cited by examiner

*Primary Examiner*—Anabel M Ton
(74) *Attorney, Agent, or Firm*—Daniel F. Nesbitt; Hasse & Nesbitt LLC

(57) ABSTRACT

A self-standing reflector, and method of making same, comprising a main reflector formed from at least one sheet of reflective material, and at least one reflective insert joined to the main reflector. The main reflector is typically formed by folding a plurality of flat panels along fold lines pre-formed in the sheet into abutting relationship to define a predetermined three-dimensional reflector shape. The reflective insert can have a plurality of facets formed into its reflective surface and is joined to the interior surface of the folded main reflector, and has a reflecting surface disposed inboard from the interior reflective surface of the main reflector. The main reflector and the reflective inserts have a reflectance of at least 95% (Miro 4). The fold-up reflector with its reflective inserts directs reflected light to a predetermined area to provide improved area lighting with less light scatter and improved efficiency.

18 Claims, 12 Drawing Sheets

SELF-STANDING REFLECTOR FOR A LUMINAIRE

CROSS REFERENCE TO RELATED APPLICATIONS

This application claims the benefit of U.S. Provisional Application No. 60/721,625, filed Sep. 29, 2005.

FIELD OF THE INVENTION

The present invention relates generally to luminaires and, more particularly, to three-dimensional reflectors for such luminaires to produce a light distribution pattern in an area to be illuminated, and its method of manufacture.

BACKGROUND OF THE INVENTION

Luminaires are designed to produce a predetermined light distribution pattern in an area to be illuminated, such as in parking lots, along roadways, or in other areas requiring broad or focused illumination of a surface. Luminaires generally include a housing or enclosure that supports a light socket, a high-intensity light source mounted in the socket, a light reflector mounted behind and/or around the light source, and other electrical hardware necessary to energize the light source. The illumination pattern created by the luminaire is generally defined by the shape of the light reflector mounted in the luminaire, as well as the position of the light source relative to the reflector. The reflector can form a partial enclosure about the source of light so that the inner surfaces of the reflector direct reflected light through an opening formed in a lower portion of the luminaire housing.

In the past, one-piece reflectors have been fabricated by molding or otherwise forming a flat piece of metal or other suitable reflective material into a desired reflector shape. The reflector can be formed by forming a sheet of reflective material between male and female dies that have cooperating three-dimensional shapes defining the reflector shape. Alternatively, the reflector may be formed by hydroforming the sheet of reflective material over a three-dimensional male form that defines the reflector shape as is well known in the art. In another method, the reflector may be spun by contouring a sheet of reflective material over a revolving male mandrel with a pressure tool to conform the sheet to the shape of the mandrel. In yet another method of fabricating reflectors, the sheet of reflective material may be formed using a press brake or other forming machine that successively bends the sheet along predetermined fold lines into a series of planar facets that approximate a desired curved surface of the reflector.

Reflectors have also been fabricated from multiple sheets of reflective material that have been individually shaped and formed and then assembled together to form a reflector shape. The individual parts of the multi-component reflector have either been joined together through fastening hardware or other suitable structures prior to mounting the assembled reflector in a luminaire housing, or the reflector components have been mounted individually within the luminaire housing to form the three-dimensional reflector shape within the housing.

More recently, as described in U.S. Pat. No. 6,464,378, reflectors have been fabricated from one sheet of reflective material, formed in a single hit die press or other means of fabrication, to form a series of integral reflective panels that are adapted to be joined together so that the reflective panels can be folded by hand into edge-abutting relationship to form folded reflector panels and define a predetermined three-dimensional reflector shape. The sheet of material is relatively thin to allow one or more of the panels to be curved by hand to define curved reflective surfaces, which can be joined to adjacent panels through perforated fold lines that include a series of elongated slots formed through the thickness of the sheet. These reflectors are efficient to make and store, and can be easily assembled into the three-dimensional shape at an assembly site or in the field.

In most outdoor lighting installations, reflectors of generally standard configurations and illumination lamps of generally standard sizes are assembled onto light poles of generally standard height, to provide a general illumination pattern. The illumination needs of a particular parking lot, roadway or other outdoor area are met by positioning a plurality of the standard outdoor light installations into a pattern sufficient to meet the illumination needs. Consequently, in some lighting installations that are used widely, a lighting design may throw light beyond the area of need, and may have uneven illumination of the ground, road or parking area. In many applications, a larger illuminating lamp may be required because of the loss of light outside the desired illumination area, or because of uneven lighting.

Thus, there is a need for a reflector that can be configured to provide more even and effective use of all the light that is emitted from an illumination bulb, to light particular outdoor areas.

There is also a need for a self-standing reflector and method of making that allows the reflector to be rapidly formed easily and consistently from at least one sheet of reflective material in relatively few manufacturing steps or forming operations.

There is also a need for a reflector that can provide improved illumination, or comparable illumination to conventional reflectors while using an illumination lamp of lower lumen output.

There is yet also a need for a reflector and method of making same that allows the reflector to be formed from at least one sheet of reflective material with substantially continuous curves on the inner reflective surfaces of the reflector and retained in a predetermined three-dimensional shape.

SUMMARY OF THE INVENTION

The present invention overcomes the foregoing and other shortcomings and drawbacks of luminaire reflectors and methods heretofore known. While the invention will be described in connection with certain embodiments, it will be understood that the invention is not limited to these embodiments. The invention includes all alternatives, modifications and equivalents within the spirit and scope of the present invention.

The present invention provides a self-standing reflector, and method of making same, comprising a main reflector and at least one reflective insert joined to the main reflector.

The present invention relates to a self-standing reflector for a luminaire that has a light source securable therein, having an opening through which light from the source is emitted, and comprising:

a main reflector having an interior reflective surface, comprising a plurality of reflector panels retained in a predetermined three-dimensional reflector shape that defines the light emitting opening; and at least one reflective insert joined to the at least one of the plurality of reflector panels, the at least one reflective insert having a reflecting surface disposed inboard from the interior reflective surface.

Typically, the main reflector and its plurality of folded reflector panels is formed from at least one sheet of material. More typically, he at least one sheet comprises a plurality of planar panels that are folded along fold lines pre-formed in the sheet, into folded reflector panels in abutting relationship that define the predetermined three-dimensional reflector shape. The folded reflector panels have at least one side edge abutting a side edge of an adjacent reflector panel, wherein the reflector panels are engaged with the side edge of the adjacent reflector panel with a securement means, to retain the main reflector in the predetermined three-dimensional reflector shape. The securement means can include at least a first securement member formed proximate the side edge for engagement with the side edge of the adjacent panel.

The present invention further relates to a method of illuminating an area with an energy-efficient, light-directing reflector luminaire, using less power than with a conventional reflector luminaire, comprising the steps of:

1) providing a luminaire having a conventional reflector having an inner reflective surface having a reflectance of less than 95% (less than Micro-4), which emits a reference amount of lumens in a circular pattern from a first lamp of X Watts, for illuminating a rectangular target area with a minimum illuminance;
2) providing an energy-efficient, light-directing reflector comprising a main reflector comprising a plurality of reflector panels forming an inner reflective surface, and a plurality of reflective inserts joined to the interior surface of the main reflector, each reflective insert having a reflecting surface disposed away from the interior reflective surface of the main reflector, wherein the surfaces of the reflector panels and the reflecting surfaces of the reflective inserts have a reflectance of at least 95%,
3) providing a second lamp of about 0.7X to 0.95X Watts; and
4) replacing the conventional reflector with the energy-efficient, light directing reflector, and replacing the first lamp with the second lamp, and illuminating the rectangular target area, wherein the rectangular target area is uniformly illuminated with at least the minimum illuminance.

The combination of the higher reflectance of the reflective surfaces of the reflector with its light directing features, enables the energy efficient, light-directing reflector with the second lamp to emit at least the reference amount of illuminance in a rectangular illuminance pattern, while reducing power by 25% to 33%.

Typically, the first luminaire lamp has a power of at least 100 Watts, more typically at least 400 Watts, and even more typically of at least 1000 Watts. More typically, the second luminaire lamp has a power of 0.7X to 0.8X Watts.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
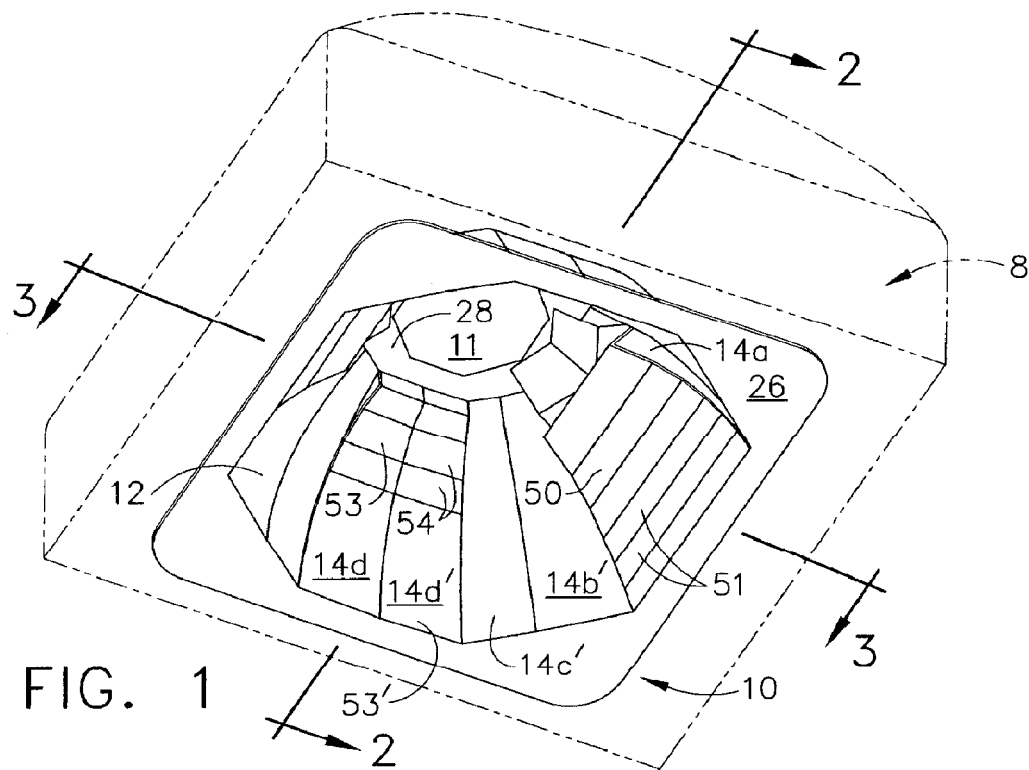
FIG. 1 is a bottom perspective view illustrating one embodiment of a self-standing reflector of the present invention, installed in a luminaire housing.

The main reflector of the self-standing reflector of the present invention has an interior reflective surface that is formed to reflect light from a lamp disposed within a cavity formed by the main reflector. The interior reflective surface is configured to reflect efficiently the light that is emitted from a lamp through the light-emitting opening of the luminaire, either directly or off of another reflector panel. Typically, the main reflector can be a conventional reflector for reflecting light from a lamp through the opening of the luminaire in which it is disposed. The typical reflector comprises a plurality of reflector panels that are retained in relationship with one another into a predetermined three-dimensional reflector shape. The plurality of reflector panels are typically retained into the predetermined three-dimensional reflector shape using a securement means.

The main reflector can be fabricated by molding or otherwise forming a flat piece of metal or other suitable reflective material into a desired reflector shape. The main reflector can be formed by forming a sheet of reflective material between male and female dies that have cooperating three-dimensional shapes defining the reflector shape. Alternatively, the main reflector can be formed by hydroforming the sheet of reflective material over a three-dimensional male form that defines the reflector shape as is well known in the art. In another method, the main reflector can be spun by contouring a sheet of reflective material over a revolving male mandrel with a pressure tool to conform the sheet to the shape of the mandrel. In yet another method of fabricating reflectors, the sheet of reflective material may be formed using a press brake or other forming machine that successively bends the sheet along predetermined fold lines into a series of planar facets that approximate a desired curved surface of the main reflector.

The main reflector can also be fabricated from multiple sheets of reflective material that have been individually shaped and formed and then assembled together to form a reflector shape. The individual parts of the multi-component main reflector have either been joined together through fastening hardware or other suitable structures prior to mounting the assembled reflector in a luminaire housing, or the reflector components have been mounted individually within the luminaire housing to form the three-dimensional reflector shape within the housing.

More typically, the main reflector comprising the plurality of folded reflector panels is formed from at least one planar sheet of material having a plurality of planar panels, which are folded along fold lines pre-formed in the at least one sheet into abutting relationship to define the predetermined three-dimensional reflector shape. The folded reflector panels have at least one side edge abutting a side edge of an adjacent folded reflector panel, wherein the folded reflector panels are engaged with the side edge of the adjacent reflector panel with a securement means, to retain the main reflector in the predetermined three-dimensional reflector shape. The reflector panels are typically formed or secured integrally at the proximal end to adjacent reflector panels to form a collar that serves to support and suspend the luminaire, while the distal ends of the reflector panels are folded and affixed to a peripheral base that defines the light-emitting opening.

The reflective inserts are joined to the interior reflective surface of main reflector, and more typically to the reflector panels of the main reflector. The reflective insert typically has at least one reflecting surface facing inwardly toward the interior cavity and the light-emitting opening of the main reflector, and has a portion of its reflective surface disposed inboard from the interior reflective surface of one of the reflector panels.

A reflective insert typically is inserted over top of (overlays), and is disposed inwardly from, a reflector panel of the main reflector, toward the center of the cavity of the reflector. In another embodiment, the main reflector, upon being formed into the pre-determined three-dimensional shape, can have one or more open areas or gaps between adjacent panels wherein the reflective insert overlays and is disposed inwardly from the open area or gap. This can reduce the material cost of the main reflector without loss of reflective surface to reflect emitted light.

One or more of the reflective inserts can be configured and inserted into the main reflector. Pairs of reflective inserts, including symmetrical pairs, can be attached to extend from oppositely-disposed first reflector panels of the main reflector. This configuration is typically used when the distribution of emitted and reflected light from the luminaire is at least partly symmetrical. The reflective insert can be attached proximate a distal end of the reflector panel, near the light-emitting opening, and/or can be attached along the length or at the proximal base of the reflector panels. The luminaire can further comprise a second pair of reflective inserts extending from oppositely-disposed second reflector panels of the main reflector that are arranged perpendicular to the first reflector panels (substantially 90° from the first reflector panel along the base of the main reflector). Additional inserted reflector panels can be attached to the main reflector adjacent to or between the first reflective inserts and/or second reflective inserts.

Each sheet of material used in the making of the main reflector is preferably formed in a single hit die press to form a series of integral reflector panels. The sheets of reflective material can be adapted to be joined together so that the panels may be folded by hand into edge-abutting relationship to define a predetermined three-dimensional reflector shape. At least some of the panels can include substantially non-linear free edges that abut substantially non-linear free edges of abutting panels. Each sheet of material is relatively thin to allow one or more of the panels to be curved by hand or with a hand tool, to define curved reflective surfaces. In this way, the abutting curved panels form a substantially contiguously-arranged curved reflective surfaces within the reflector.

The panel can be joined to adjacent panels by any suitable means that at least retains the shape of the three-dimensional reflector. The securement means can comprise tabs extending from the side edge of the panel, which can overlap over the edge of the adjacent panel. The securement means can also comprise rivets, screws, bolts, adhesive and other equivalent securements. The securement means can also include a locking means that both holds and locks the adjacent panels in the three-dimensional form, and can include, for example, a tab formed in a panel that passes through an elongated slot formed through the thickness of the edge of the adjacent sheet, and folded over to lock the tab within the slot.

The fold lines in the sheet can be scored to allow the sheet of material to be easily folded by hand along the fold line to form the desired three-dimensional reflector shape. Alternatively, a backing member made of relatively stiff sheet material can be attached to or otherwise operatively engaged with the sheet of reflective material. The backing member and sheet are positioned relative to each other so that at least one elongated edge of the backing member is coincident with a predetermined fold line in the sheet. Upon folding of a panel by hand, the edge of the backing member defines a consistent line of bending in the sheet along the predetermined fold line. In another alternative embodiment of the present invention, perforations, such as holes or elongated notches, are provided in the sheet to define at least one generally narrow connecting web associated with at least one of the panels. The connecting web defines a consistent line of bending in the sheet that is coincident with a predetermined fold line.

The reflective inserts can be formed from a sheet of material with a reflective surface, typically by a single hit die press or other suitable means. In one embodiment, the reflective insert comprises a plurality of facets. Folds formed in the reflective insert can form a plurality of reflective facets, typically formed by a press break. The reflective insert can have one or more securement means for attachment to the reflector housing (as previously described herein), and typically can comprise tabs or slots that cooperate with complementary slots or tabs in the main reflector. The attachment tabs can hold the reflective inserts in position with the main reflector, and optionally in locking attachment to the main reflector.

In an alternative embodiment, the reflective insert can comprise a flat sheet which does not have any permanent crease or fold in its surface. The reflective insert can have a smooth curved surface along its length. Such smooth surface reflective inserts can be folded or bowed into a biased shape, and held in the biased shape by securements, such as tabs that extend from the ends of the flat sheet (see for example tabs 161 and 162 of element 157 in FIG. 16), and which can be inserted into mating slots in the main reflector (see for example slots 164 and 165 of sheet element 122 in FIG. 14).

The reflective inserts can be formed from a sheet of material with a reflective surface, typically by a single hit die press or other suitable means. The shape of the reflective insert is designed to reflect emitted light from the lamp out through the opening to a predetermined location below the luminaire. Typically, the design and attached positioning of the reflective inserts cooperate with the folded reflector panels of the main reflector housing to achieve the desired distribution and reflectance of the luminaire.

The use of flat sheets of a pre-formed template, with a plurality of perforated or scored fold lines formed in the surface, can be folded into the main reflector having folded reflector panels, or into insertable reflective inserts. The use of scored lines allows for changes to be made in the design and configuration of the reflectors and inserts with relative ease and efficiency.

The main reflector blanks and the reflective insert blanks can be stored flat until needed, and readily assembled by hand for installation in a luminaire at the time and place of luminaire assembly, thereby requiring less warehouse space to store the various reflector shapes than would be required for storing pre-formed three-dimensional reflectors. It will also be appreciated that the self-standing reflector of the present invention provides a pre-formed three-dimensional reflector shape that can be easily and consistently formed from at least one sheet of reflective material without a press brake or similar forming machine.

Figure 2:
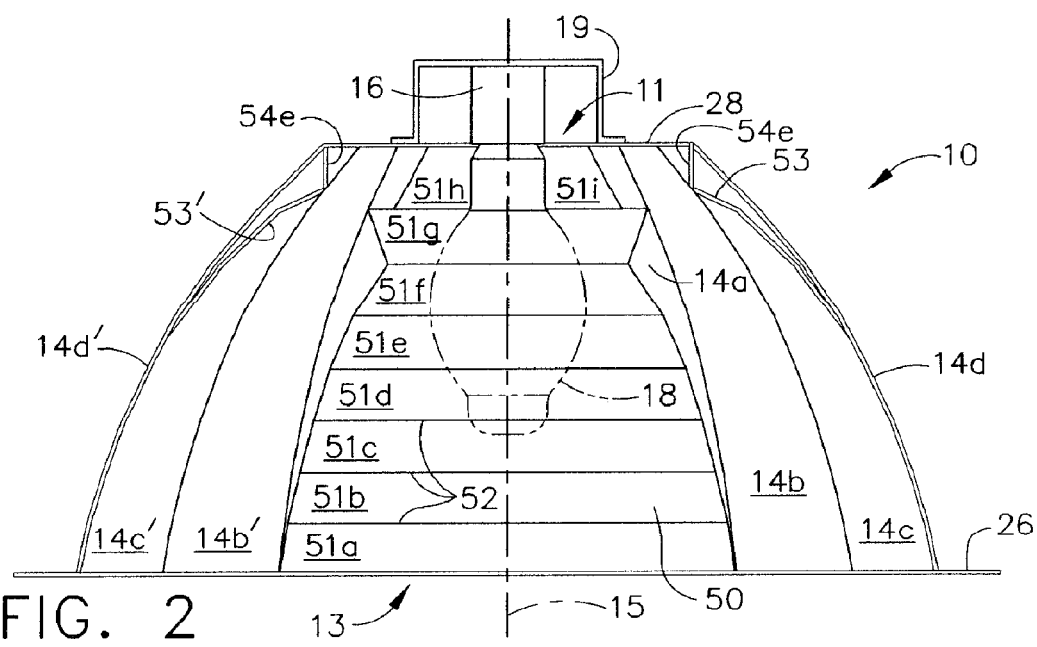
FIG. 2 is a first or back cross sectional view of the self-standing reflector showing a reflective insert.

With reference to the figures, and to FIGS. 1 and 2 in particular, one embodiment of a self-standing reflector 10 is shown. FIG. 2 is a lateral cross-sectional view through the reflector 10, showing the rear. The self-standing reflector can be installed in a luminaire housing 8 of a luminaire assembly (FIG. 1), to include the self-standing reflector 10, a light source socket 16 disposed proximate the top opening 11 of the reflector 10, and a light source such as a lamp 18 mounted in the socket for emitting light from an opening 13 in the bottom end of the reflector. The self-standing reflector 10 is secured into the housing 8 by means well known in the art. A bracket 19 supports the light source socket 16 proximate the opening 11 in the top of the main reflector 12 so that the socket 16 supports the inserted lamp 18 in a position that extends through the opening 11 and into the inner space or cavity of the main reflector. Bracket 19 is shown as channel shaped and includes legs that descend from a central base and are affixed to or secured to the main reflector 12. The socket 16 is mounted to the central base through a suitable fastener (not shown) as is well known in the art. A lens (not shown) can be mounted on the underside of the luminaire housing to cover the opening of the housing 8 and the opening 13 of the reflector 10. The reflector 10 is positioned behind and about the lamp 18 to direct or reflect light in a predetermined light distribution pattern through the opening 13. As those of ordinary skill in the art will appreciate, luminaire housing 8 can be formed in a variety of shapes and sizes, and is typically mounted on a pole or other supporting structure to raise the luminaire assembly far enough above the ground to provide a broad light distribution pattern on the ground. It will be appreciated that luminaire assembly can also include a transformer, capacitor or other electrical hardware mounted in luminaire housing and connected to a source of power for energizing the light source via suitable wiring connected to socket. A typical luminaire assembly is described in U.S. Pat. No. 6,464,378, incorporated herein by reference.

In accordance with one aspect of the present invention, the lamp 18 is mounted in the socket 16 with its longitudinal axis aligned generally along an optical axis 15 of the reflector 10 generating a reference amount of illuminance into a rectangular pattern, or a pattern of any desired shape, on the ground or the surface below the luminaire.

The reflector 10 comprises a main reflector 12 and a plurality of reflective inserts 50 and 53. The main reflector 12 is preferably formed from a unitary single sheet of reflective material 22 (see FIG. 8) that can be die cut in a die press operation or otherwise formed using methods known in the art. The sheet of reflective material 22 may be polished anodized aluminum (also known as "specular aluminum"), semi-specular aluminum, or other reflective material that has the desired reflective and other structural properties for a reflector. A preferred highly specular sheet is available as Alanod Miro-4 a highly specular anodized aluminum with minimum 95% reflectance, and is available from ALANOD Aluminium-Veredlung GmbH & Co. KG. The sheet 22 can have a thickness of about 0.020 inch to permit it to be folded and curved by hand, a hand tool, or a hand-operated tool into a desired three-dimensional reflector shape, as will be described in greater detail below. The sheet of reflective material 22 is adapted to be folded and curved at the factory or at the installation site into the main reflector 12 that can then be mounted into the luminaire housing. As will be described in detail below, it is contemplated that one sheet, or more than one sheet joined together, can be folded to form the desired three-dimensional reflector shape in accordance with the principle of the present invention.

Figure 8:
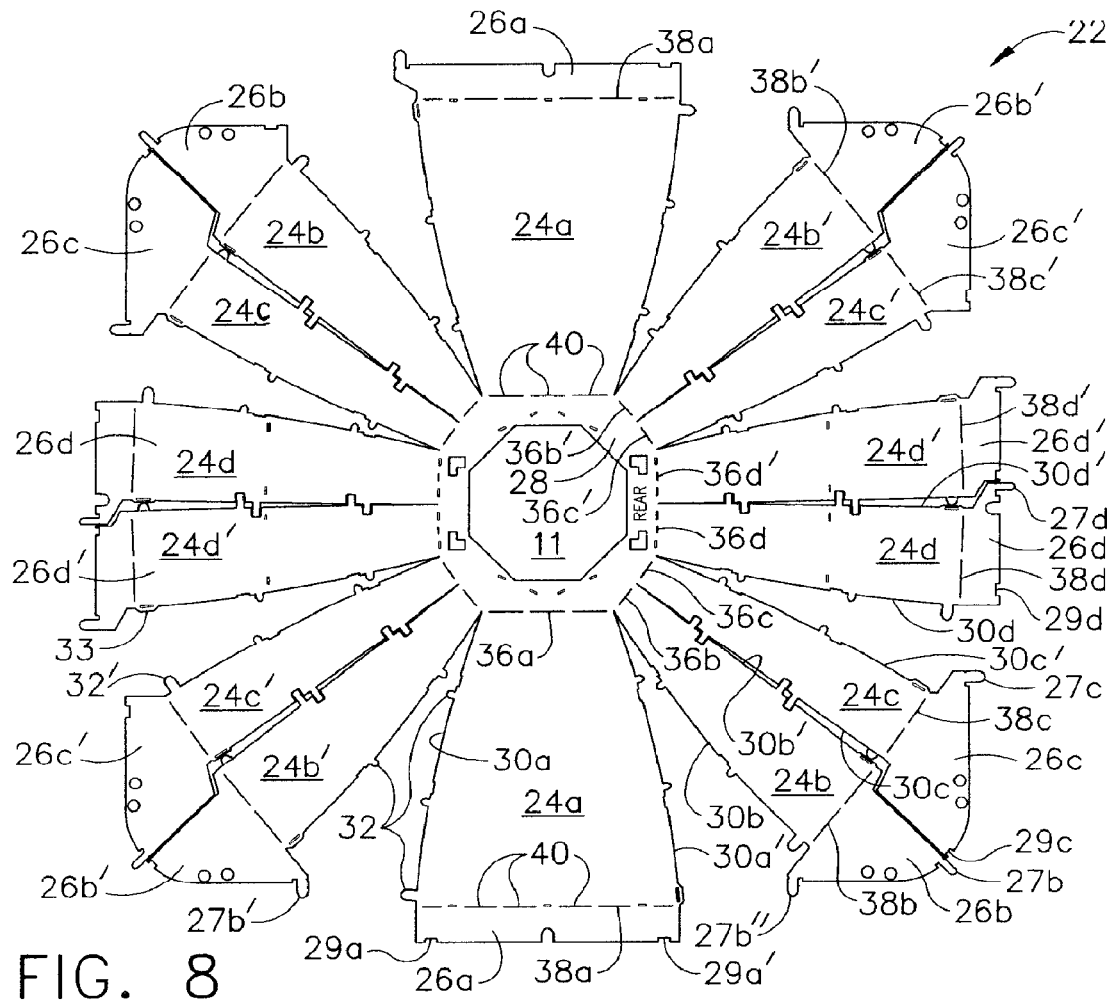
FIG. 8 is a plan view of a preformed sheet that can be folded into a main reflector of the first embodiment.

In accordance with one aspect of the present invention as best understood with reference to FIG. 8, the sheet of patterned reflective material 22 includes a plurality of planar integral panels 24 (individually labeled 24a-24d, and 24b'-24d'), mounting flanges 26 (labeled 26a-26d, and 26b'-26d'), and collar 28 that generally lie in a common plane after formation of the sheet 22 from the die press or other forming operation. In the illustrated embodiment, the panels 24 are configured in different shapes and lengths along their bases (the portion proximate the mounting flanges 26), depending upon the light-reflecting performance needed from the panel. Each panel 24 is formed with a pair of spaced elongated linear or non-linear free edges 30 (individually labeled 30a-30d, and 30a'-30d') that are adapted to abut a non-linear free edge 30 of an abutting panel 24 when the panels 24 are folded to form the assembled reflector 10 shown in FIG. 1. Each panel 24 typically has at least one, and more typically a plurality of, tabs 32 extending outwardly from the free edges 30 to aid in aligning, positioning, and holding together the abutting panel edges 30. The plurality of tabs 32 can cooperate with the side edges 30 of the panels to form a locking means, which is intended to prevent the folded reflector from loosing its folded configuration through normal handling and use. Other locking means can include a combination of a tab 32 on one edge 30 engaging a slot 33 in a portion of an abutting panel, such as shown in FIG. 8 along the edges of the panels 24 proximate the mounting flanges 26.

The panels 24 are joined to the collar 28 through a fold line 36 (individually labeled 36a-36d, and 36b'-36d') and the mounting flanges 26 are joined to respective panels 24 through fold lines 38. Preferably, fold lines 36 and 38 include a series of elongated apertures 40 formed through the thickness of sheet 22 to permit folding of the sheet 22 along the fold lines 36 and 38 by hand. While a series of elongated apertures 40 are illustrated in a preferred embodiment for forming fold lines 36 and 38, it will be appreciated by those of ordinary skill in the art that fold lines 36 and 38 can be formed by smaller circular apertures, slits, score lines or other bendable or yielding structures formed in the unitary, single-piece sheet 22 without departing from the spirit and scope of the present invention. While pre-formed fold lines are preferred, it is contemplated that other structures formed into the sheet of reflective material, or attached thereto, are possible to define predetermined fold lines or lines of bending in the sheet of reflective material upon folding of the sheet.

The three-dimensional main reflector 12 is formed by folding and associating the panels 24 and mounting flanges 26 of the sheet 22. Each of the separate panels 24 is adapted to be folded downwardly and inwardly along fold lines 36, and also curved to form and become the curved reflector panels 14 with inside curved reflective surfaces. The mounting flanges 26 are adapted to be folded upwardly along fold lines 38. The collar 28 is typically within the original plane of the sheet 22, although the collar can alternatively include slits (not shown) to form a plurality of collar portions that can be folded upwardly. As the planar panels 24 are brought into abutting relationship as shown in FIG. 1 to abut opposed free edges 30, the panels are gently curved to form curved reflector panels 14 with reflective surfaces on the inside surface of the main reflector 12. In FIG. 8 the flange securing means is a locking tab 27 and locking notch 29. When the reflector panels 14 are formed, and the mounting flanges are brought into abutting relationship, they can be secured together.

In the illustrated embodiment, panel 24b, which is adjacent to panel 24a, is typically first folded downward along fold 36b, and mounting flange portion 26b is folded upward into a mounting-flange forming position. Then adjacent panel 24c is similarly folded, so that its mounting flange portion 26c overlies flange 26b, with locking tab 27b" registering with locking notch 29c. In this position, locking tab 27b is folded upward and over the edge of locking notch 29c to secure the flange portions together. Next adjacent panel 24d is similarly folded, so that its mounting flange portion 26d overlies flange 26c of panel 24c, with locking tab 27c registering with locking notch 29d. In this position, locking tab 27c is folded upward and over the edge of locking notch 29d to secure the flange portions together. The remaining panels 24 are similarly folded and secured, moving in counter-clockwise order. The mounting flange 26a of the panel 24a is last folded, with the final locking tabs 27b" (of first folded panel 24b) and 27b' (of next-to-the-last panel 24b') registering with the locking notches 29a and 29a' of panel 24a. It can be appreciated that the flange securement means cooperate upon assembly of main reflector 12 to retain its self-standing three-dimensional reflector shape. Those of ordinary skill in the art will appreciate that other locking structures and folding configurations are possible to form and retain the main reflector 12 in its self-standing reflector shape without departing from the spirit and scope of the present invention. In a preferred abutting relationship of panels 24, the positioning tabs 32 of one curved or folded reflector panel 14 can overlie the abutting marginal edge of the adjacent curved reflector panels 14 to hold the free edges 30 of the reflective panels 14 in abutting relationship. In this way, a substantially contiguously-arranged curved reflective surface is formed within main reflector 12 by the abutting curved panels 14.

The self-standing reflector 10 also comprises at least one reflective insert 50 joined or attached to the interior reflective surface of the main reflector 12, the reflective insert having at least one reflecting surface disposed inboard or inwardly from the interior reflective surface of the main reflector 12, toward the optic centerline. As shown in FIG. 1 and FIG. 2, a first pair of reflective inserts 50 are disposed on opposite first and second sides of the main reflector 12. The reflective inserts 50, now shown in FIGS. 2 and 9A, have a surface having a plurality of facets 51 defined by a plurality of fold lines 52. The row of facets can be arranged along a length dimension of the reflective insert. The length dimension of the insert is typically aligned with the optic centerline 15 of the luminaire. The facets can be rectangular, square, or other shape. A row of facets can also comprise two or more facets proximally arranged transverse, for example, side by side in the lateral dimension, to the length dimension. The plurality of facets 51 in the folded reflective insert 50 extend from proximate the mounting flange 26 at the bottom opening 13, toward the collar 28 at the top opening 11, and forms a portion of the light-reflecting surface of the self-standing reflector 10.

Figure 3:
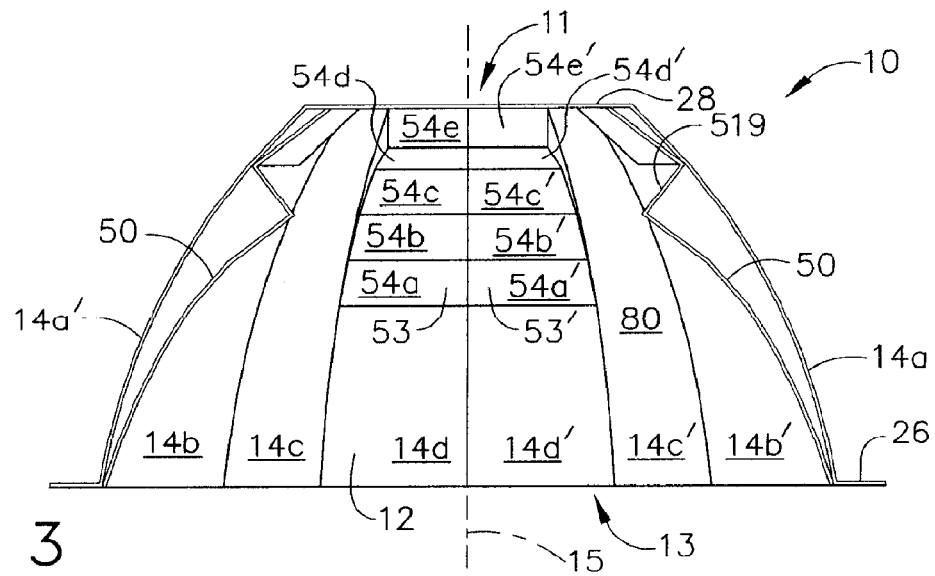
FIG. 3 is a second or side cross sectional view of the self-standing reflector showing a second reflective insert

As shown in FIGS. 2 and 3, a second pair of reflective inserts 53 are disposed on opposite third and fourth sides of the reflector housing 10 that are perpendicular (90° offset) from the first and second sides about the axis 15 of the reflector 10. The reflective inserts 53 can be affixed to the inner surface of the reflector housing, such as with a securement or locking means as described herein, such as a slot and tab arrangement. It can be understood that the reflective inserts 50 and 53 cover or over-lay the inner surface of the reflector panels 14 of the folded main reflector 12, to reflect differently the light emitted at such panels by the light source 18.

FIGS. 1, 2 and 3 illustrate the self-standing assembled reflector 10, including the main reflector 12 having two pairs of opposed first reflector panels 14a disposed on opposite sides of the main reflector 12, and the pair of opposed first reflective inserts 50, each joined to and disposed inboard from the pair of first reflector panels 14a, respectfully. Also shown are two pair of opposed second reflector panels 14d and 14d' disposed on opposite sides of the main reflector 12 and being perpendicular (offset 90°) to the first reflector panels 14a, and two pair of opposed second reflective inserts 53,53', each joined to and disposed inboard from second reflector panels 14d and 14d', respectively. Also shown are two opposed pairs of third reflector panels 14b, 14c and two opposed pairs of fourth reflector panels 14b', 14c', each pair disposed between one of the first reflector panels 14a and one of the second reflector panels 14d, 14d'.

As seen in FIG. 2, which is a lateral cross-sectional rear view through the three-dimensional reflector 10, first reflective inserts 50 are affixed to the main reflector 12 at its lower end proximate the flange 26, and at its upper end proximate the collar 28. The lower facets 51a-51f are disposed inboard and away from the inner surface of the main reflector 12, and modify the direction of the emitted light that would have reflected from the inner surface of the underlying folded panel 14a. An intermediate facet 51g connects the distal edge of facet 51f to the inner surface of the main reflector, to attach the upper portion of the reflective insert (shown in FIG. 3). Upper facets 51h and 51i are also projecting inboard of the inner surface of the main reflector to modify the direction of the emitted light that would have reflected from the inner surface of the top of underlying reflector panel 14a. The angles of each facet 51 inwardly from vertical (axis 15) are shown in Table A.

As seen in FIG. 3, which is a cross-sectional side view of the reflector 10 that is perpendicular to the view of FIG. 2, the pair of side-by-side second reflective inserts 53 and 53' are affixed at a lower end to the main reflector 12, proximate an intermediate point 80 of the underlying folded reflector panels 14d and 14d', and at an upper end proximate to the collar 28. The each reflective insert 53,53' has a plurality of lower, laterally-oriented facets 54 (labeled 54a-54d and 54a'-54d', respectively). The second reflective inserts 53 modify the direction of emitted light that would have reflected from the inner surface of the upper portions of folded reflector panels 14d and 14d'. Each second reflective insert also has an upper facet 54 (labeled 54e or 54e', respectively) which affixes the distal edge of reflective insert 53 to the inner surface of the main reflector 12 (as shown in FIG. 2). The angle inwardly of each facet 54 from vertical (axis 15) is also shown in Table A.

TABLE A

| Facet number | Degrees from vertical |
|---|---|
| 51a | 19 |
| 51b | 22 |
| 51c | 26 |
| 51d | 31 |
| 51e | 41 |
| 51f | 53 |
| 51g | −37 |
| 51h–51i | 49 |
| 54a | 29 |
| 54b | 36 |
| 54c | 44 |
| 54d | 62 |
| 54e | 0 |

Figure 4:
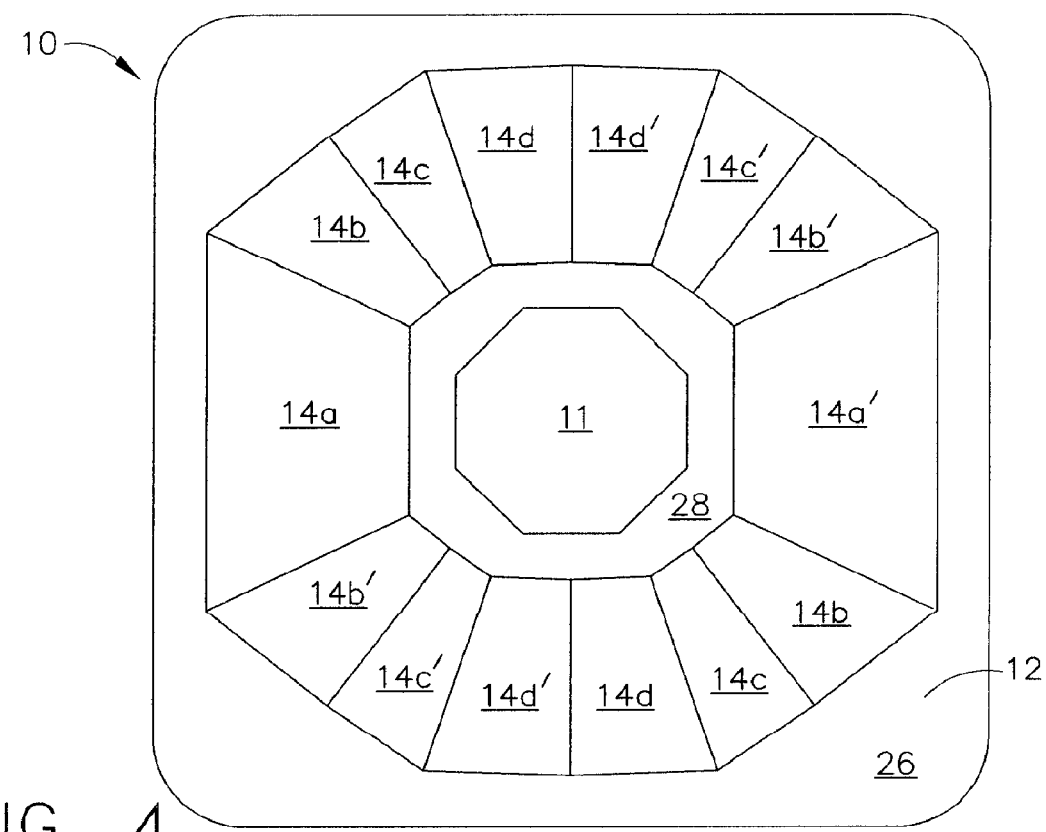
FIG. 4 is a top view of the self-standing reflector.

FIG. 4 shows a top view of the reflector 10, looking down on to the top, outer surface of the main reflector 12.

Figure 5:
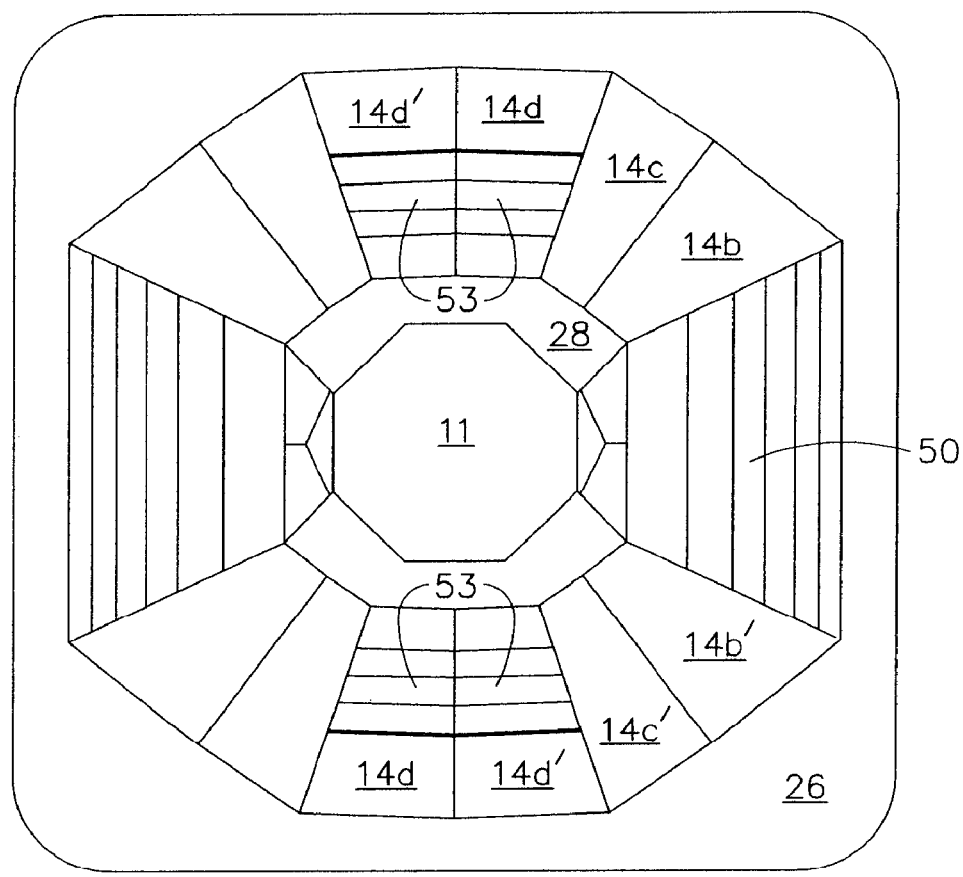
FIG. 5 is a bottom view of the self-standing reflector.
Figure 6:
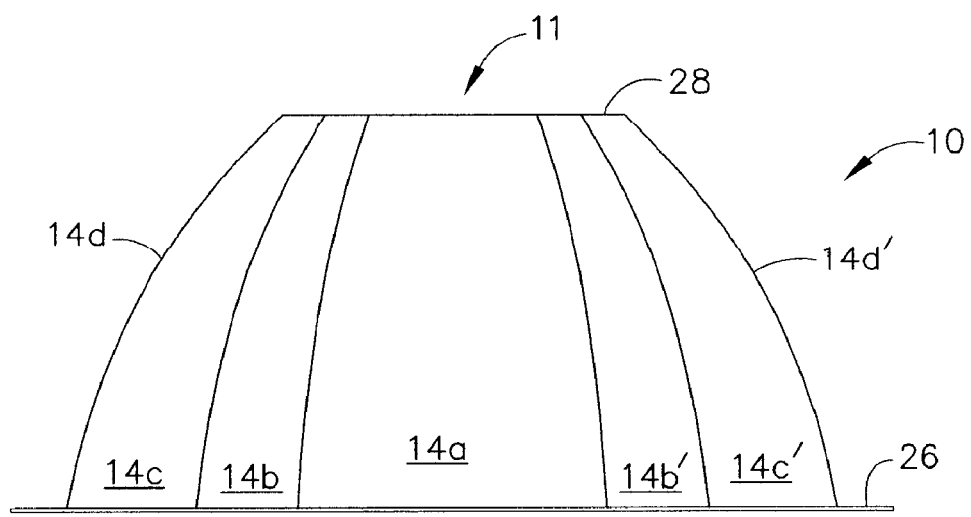
FIG. 6 is a front view of the self-standing reflector, the back view being the same.
Figure 7:
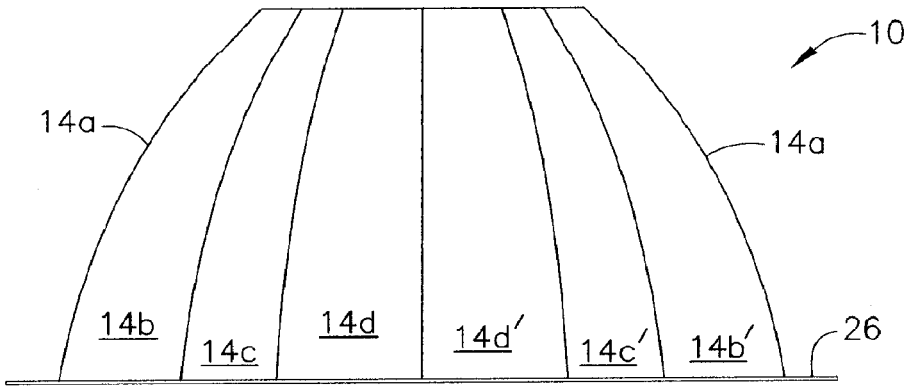
FIG. 7 is a right side view of the self-standing reflector, the left side view being the same.

FIG. 5 shows a bottom view of the reflector 10, looking up into the inner reflective surface of the main reflector 12 and the reflective inserts, 50 and 53.

Figure 9B:
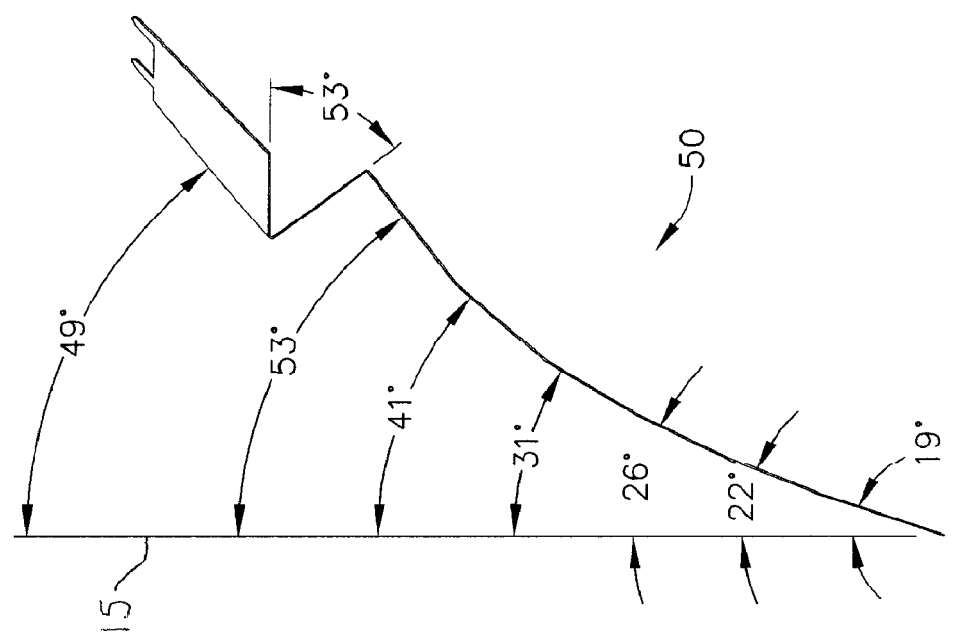
FIG. 9B is a side view of the folded first reflective insert.
Figure 9A:
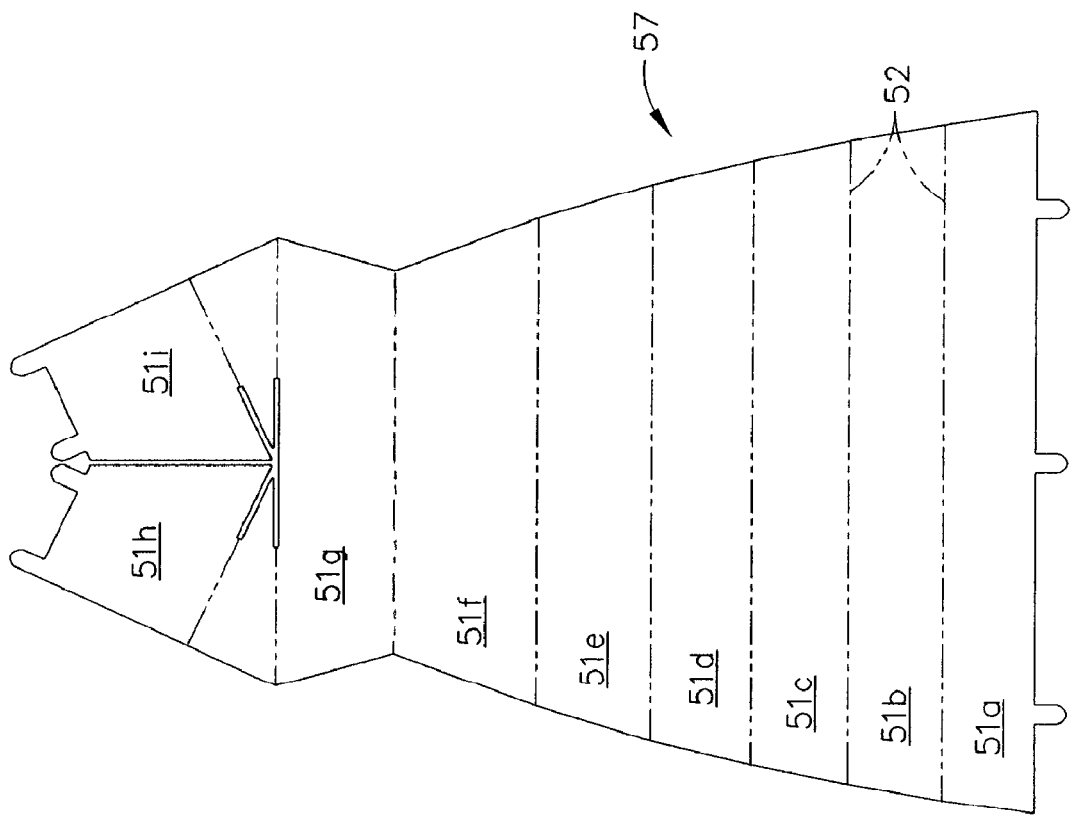
FIG. 9A is a plan view of a preformed sheet that can be folded into the first reflective insert.

FIG. 9A shows a sheet 57 of reflective material that can be stamped, and then provided with perforations or score lines 51, or reference lines for press break forming as described herein, to form the folded-up reflective insert 50 (FIG. 9B), which can then be inserted into and attached to the folded main reflector 12. FIG. 9B shows the side view of the folded-up reflective insert 50, illustrating the fold angles referred in Table 1. The dimensions of the reflective insert, the positioning of the fold lines 52, and the positioning of the reflective insert 50 within the main reflector 12 is designated and dictated by the desired light distribution pattern emitted from the reflector 10.

Figure 10A:
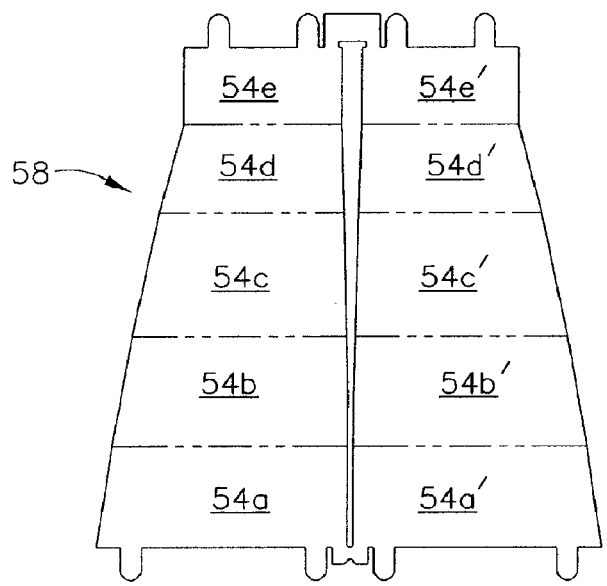
FIG. 10A is a plan view of a second preformed sheet that can be folded into the second reflective insert.
Figure 10B:
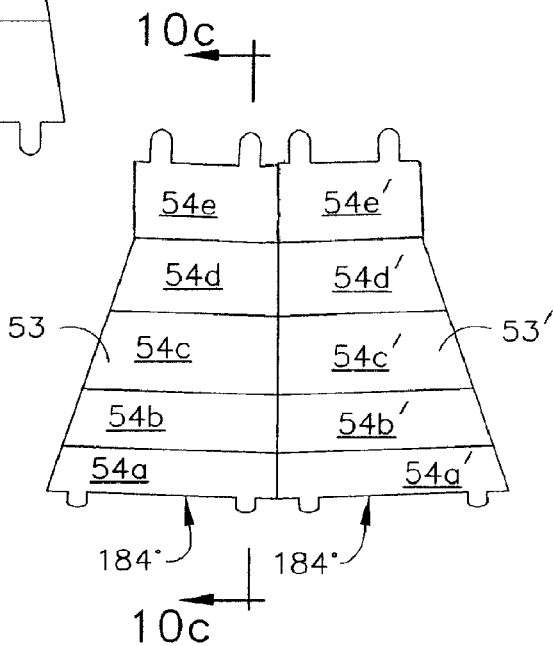
FIG. 10B is a front view of the folded second reflective insert.
Figure 10C:
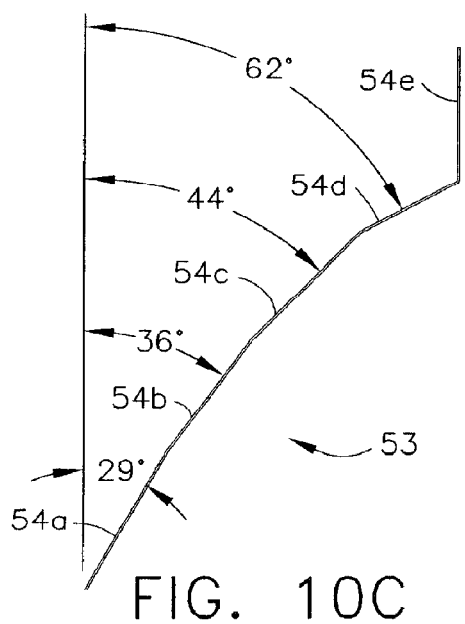
FIG. 10C is a side view of the folded second reflective insert, taken through line 10C-10C of FIG. 10B.

FIG. 10A shows a similar sheet 58 that can be similarly formed and folded into the reflective inserts 53 and 53', for insertion into the main reflector 12. In the illustrated embodiment, the two side-by-side reflective inserts 53 and 53' can be formed as a single unitary sheet 58. FIG. 10B shows the sheet 58 folded into reflective inserts 53 and 53'. FIG. 10C shows the side view of the folded-up reflective insert 53, taken through line 10C-10C of FIG. 10B, illustrating the fold angles referenced in Table 1.

Figure 11:
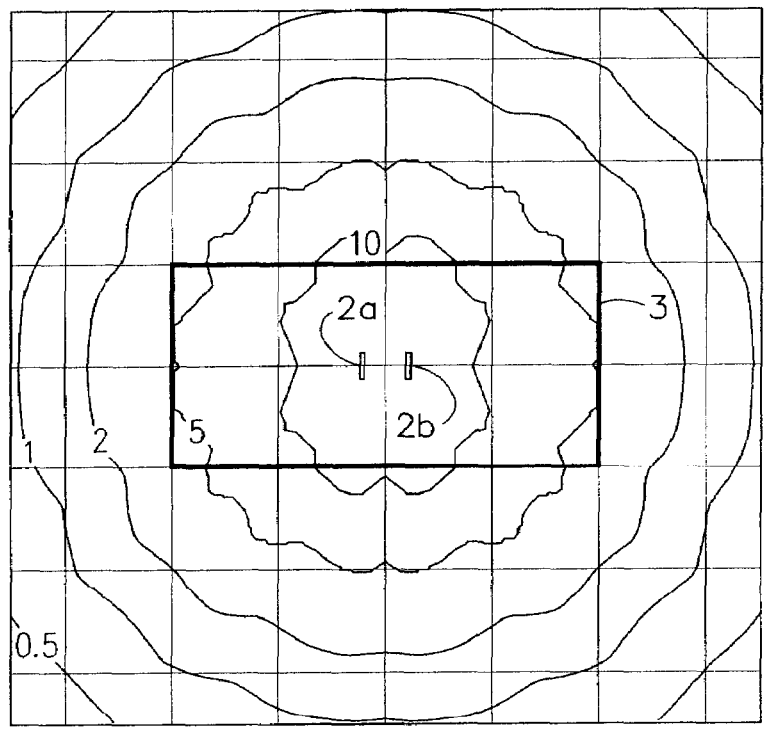
FIG. 11 is a diagram showing the light distribution pattern for a conventional reflector luminaire having a 1000 W lamp.

The energy-efficient, light directing reflector luminaire embodiment shown in FIGS. 1-9, can be used in a method of obtaining an equivalent amount of illuminance as from a conventional reflector, while using from about 25% to about 33% less power. The conventional reflector has been provided with a "Type V" illumination pattern, such as shown in FIG. 11. A "Type V" light distribution pattern has generally circular symmetry, i.e., the illumination is essentially the same at all lateral angles around the optical axis of the reflector of the luminaire at a given distance from the light source. The provided conventional reflector has an inner reflective surface having a reflectance of less than 95%, and typically about 86%, and emits a reference amount of lumens lumens in a circular pattern from a luminaire lamp of at least 1000 W, for illuminating a rectangular target area with a minimum illuminance flux. In a typical installation, the pair of conventional luminaries 2a and 2b mount to a light pole in the midst of an area to be illuminated, at about 24 feet from ground level. As shown in the light distribution map of FIG. 11, the distribution of light from the pair of conventional luminaires 2a and 2b is substantially circular. Outside the rectangular target area of interest, shown as a rectangle 3, a significant amount of light is cast.

Figure 12:
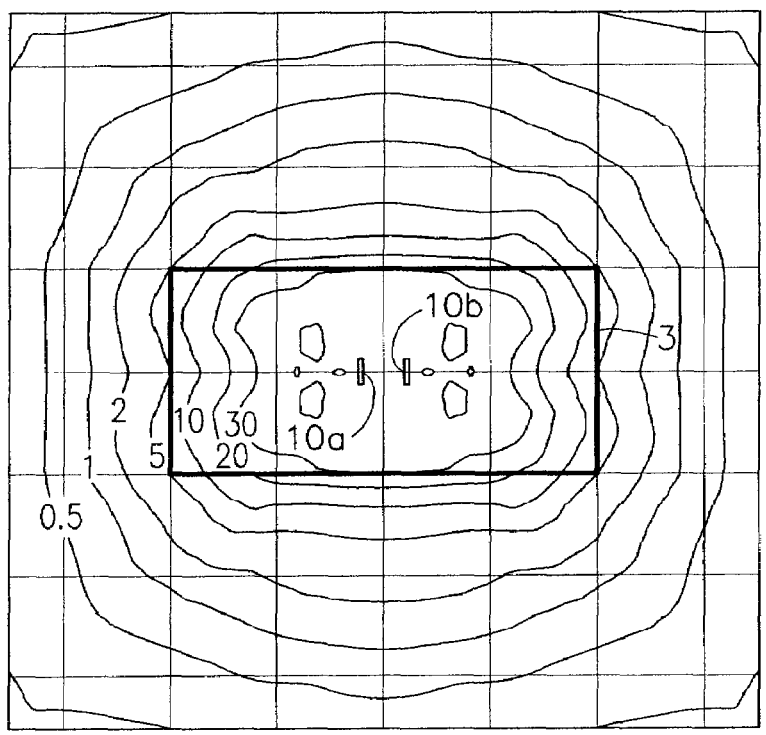
FIG. 12 is a diagram showing the light distribution pattern for a luminaire of the present invention having the self-standing reflector and having a 750 W lamp.

The energy-efficient, light directing reflector luminaire comprises a three-dimensional fold-up reflector 10 of the present invention. The reflector panels 14 and the reflective inserts 50 and 53 have reflective surfaces of Miro-4, and use a lamp of not more than 750 W. As shown in FIG. 12, the energy efficient, light-directing luminaires 10a and 10b each emit at least the reference amount of lumens in a rectangular illuminance pattern within the rectangular target area. By the combined use of a reflective material with higher reflectance, and the configuration of the fold-up reflector with reflective inserts to change the direction of the reflected light, the target amount of illumination (and typically an illumination greater than the target amount) is directed to the target illumination area 3 with 33% less energy consumption. A lesser amount of emitted and reflected light directed outside the target illumination area 3 is undesirable or wasted.

Figure 13:
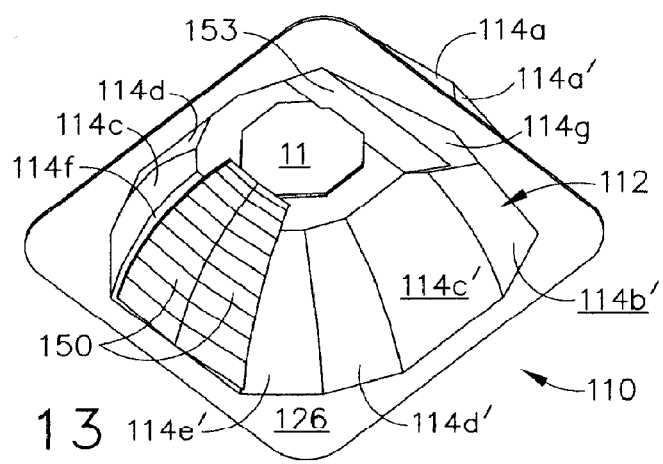
FIG. 13 is a bottom perspective view illustrating a second embodiment of a self-standing reflector of the present invention.

FIG. 13 shows an alternative embodiment of a self-standing reflector 110 in accordance with the principles of the present invention. Reflector 110 includes a main reflector 112 that is also partially enclosed about a light source, lamp 118, as shown in FIG. 15. Main reflector 112 is formed from a sheet of reflective material 122 shown in FIG. 14 that includes a pair of integral front panels 124a and 124a', a pair of opposed corner panels 124b and 124b'; a pair of opposed side panels 124c and 124c', a first pair of opposed rearward corner panels 124d and 124d', a second pair of opposed rearward corner panels 124e and 124e', a rear panel 124f, and a top panel 124g, as well as bottom mounting flanges 126 associated with each panel 124, and collar 128. The panels 124a-124e and 124a'-124e', and associated mounting flanges 126 integral thereto, are adapted to be folded and curved, typically by hand, to form the assembled three-dimensional main reflector 112. Reflector 110 is a self-standing reflector that is particularly adapted to provide a "forward throw" light distribution pattern from the perimeter of an area to be illuminated.

Figure 14:
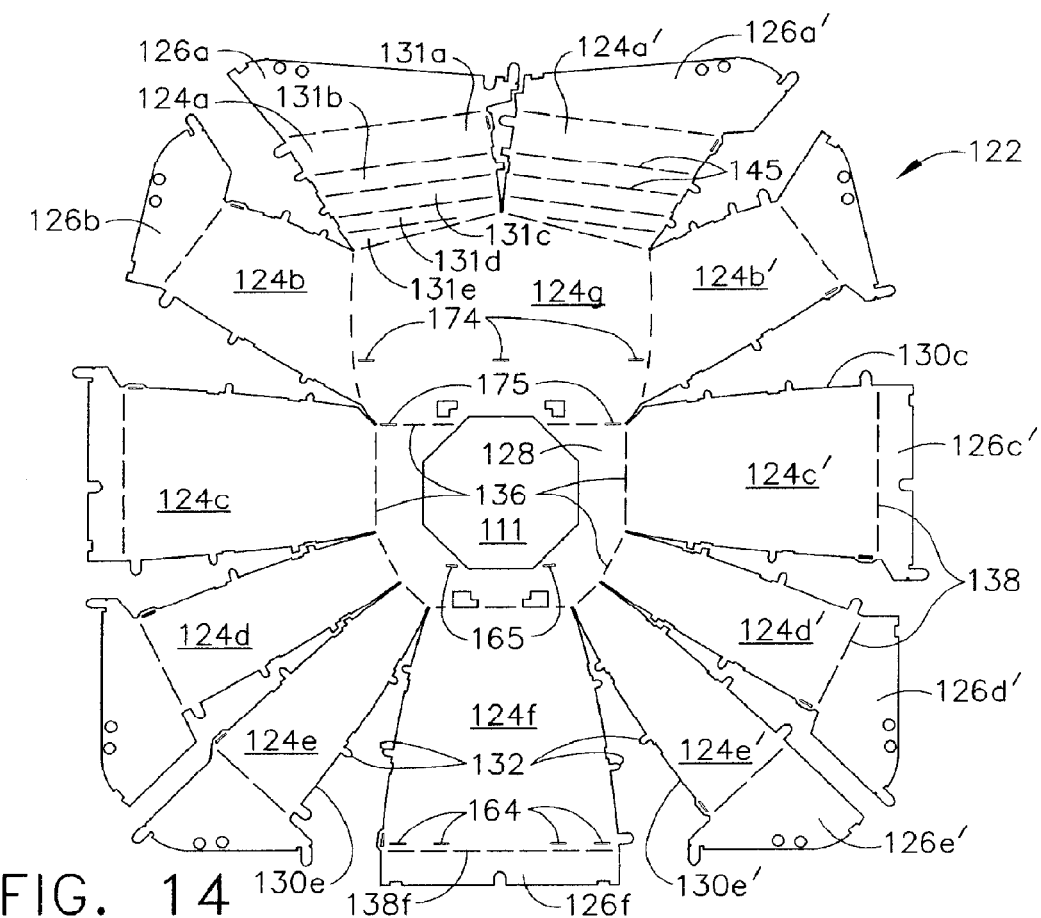
FIG. 14 is a plan view of a preformed sheet that can be folded into a main reflector of the second embodiment.
Figure 15:
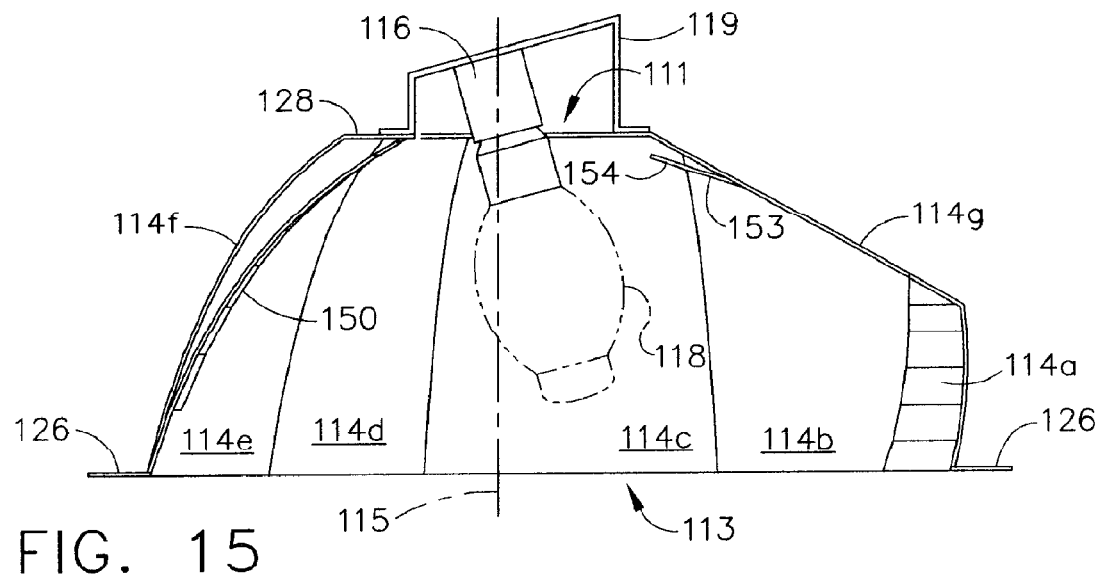
FIG. 15 is a side cross sectional view of the self-standing reflector of the second embodiment.

As shown in FIG. 14, the panels (124a-124e, 124a'-124e' and 124f) are joined to the collar 128 or to the top panel 124g, through fold line 136, and to the respective mounting flanges 126 through fold line 138. All panels except for integral front panels 124a and 124a' are folded, unscored or unperforated sheet material. The integral front panels 124a and 124a' have a plurality of fold lines 145 that enable an assembly person to form, typically by hand, a plurality of lateral facets 131a-131e and 131a'-131e', and to fold panels 124a and 124a' downwardly and inwardly from top panel 124g, to adjust the illumination pattern created by main reflector 112.

Each of the panels 124 also have substantially linear or non-linear free edges 130 and securing means comprising tabs 132 formed adjacent the free edges 130 to permit the panels to be folded and curved by hand and engaged in abutting relationship as shown in FIG. 13 to retain reflector 110 in its self-standing reflector shape. As described in detail above, reflector 110 is adapted to be fitted with a lamp bracket, socket and lamp, and mounted within a luminaire housing (not shown) through fasteners (not shown) extending through apertures formed in the mounting flanges 126.

Figure 16:
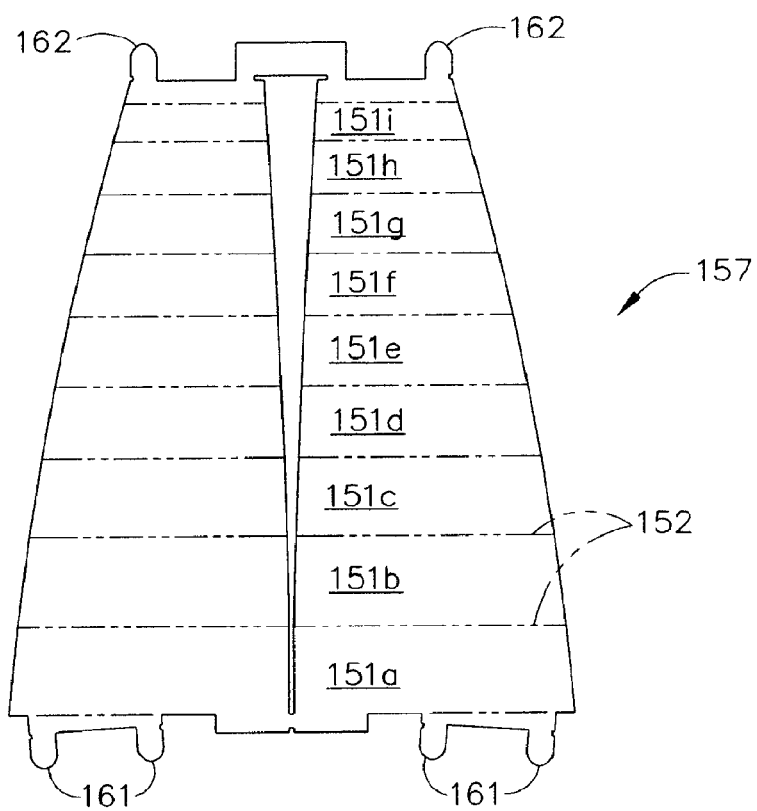
FIG. 16 is a plan view of a preformed sheet that can be folded into a first reflective insert for the second embodiment.

The illustrated embodiment of reflector 110, a longitudinal or front-to-back cross section of which is shown in FIG. 15, also comprises at least one reflective insert 150, formed from a folded sheet 157 of reflective material as shown in FIG. 16. The sheet 157 has a plurality of pairs of lateral facets 151 defined by preformed fold lines 152, and extending from its distal end that is inserted proximate the mounting flange 126, to its proximal end that is inserted near the collar 128. The pair of lateral facets in each row are attached or are abutted to form an angle of less than 180 degrees. The sheet 157 can be formed and folded as described for other reflective sheets herein before, and can be inserted into the main reflector 112 and secured in position with securement means, such as the tabs 161 and 162 in the distal and proximal ends, respectively, which register with and can be secured into corresponding slots 164 in the distal end of the panel 124f (near the fold line 138f), and to slots 165 in the collar 128, respectively (the slots are shown in the sheet 122 of FIG. 14). The angles inwardly of each facet 151 from vertical (axis 115) are shown in Table B.

TABLE B

| Facet number | Degrees from vertical |
| --- | --- |
| 151a | 17 |
| 151b | 23 |
| 151c | 29 |
| 151d | 34 |
| 151e | 40 |
| 151f | 45 |
| 151g | 50 |
| 151h | 55 |
| 151i | 59 |
| 151j | 62 |

Figure 22:
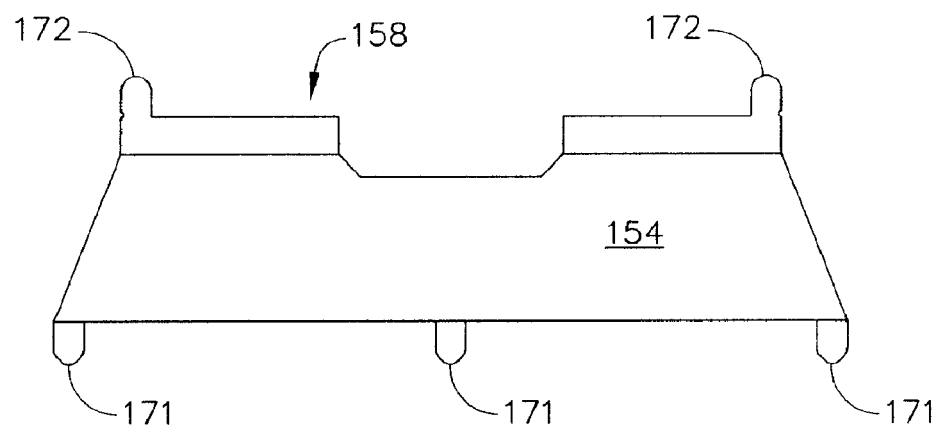
FIG. 22 is a plan view of a second preformed sheet that can be folded into a second reflective insert for the second embodiment.

A second reflective insert 153 is disposed toward the front portion of the main reflector 112, onto the top panel 114g (formed when panel 124g is folded into the main reflector 112). The second reflective insert 153 is formed by folding a flat sheet 158, shown in FIG. 22. The second reflective insert can be secured to the main reflector 112 by inserting and secured in position with securement means, such as the tabs 171 and 172 in the opposed lateral edges of the second reflective insert 153, which register with and can be secured into corresponding slots 174 and 175 in the top panel 124g and collar 128, respectively. The single large facet 154 of the second reflective insert 153 is disposed at an angle from vertical of about 71°.

Figure 17:
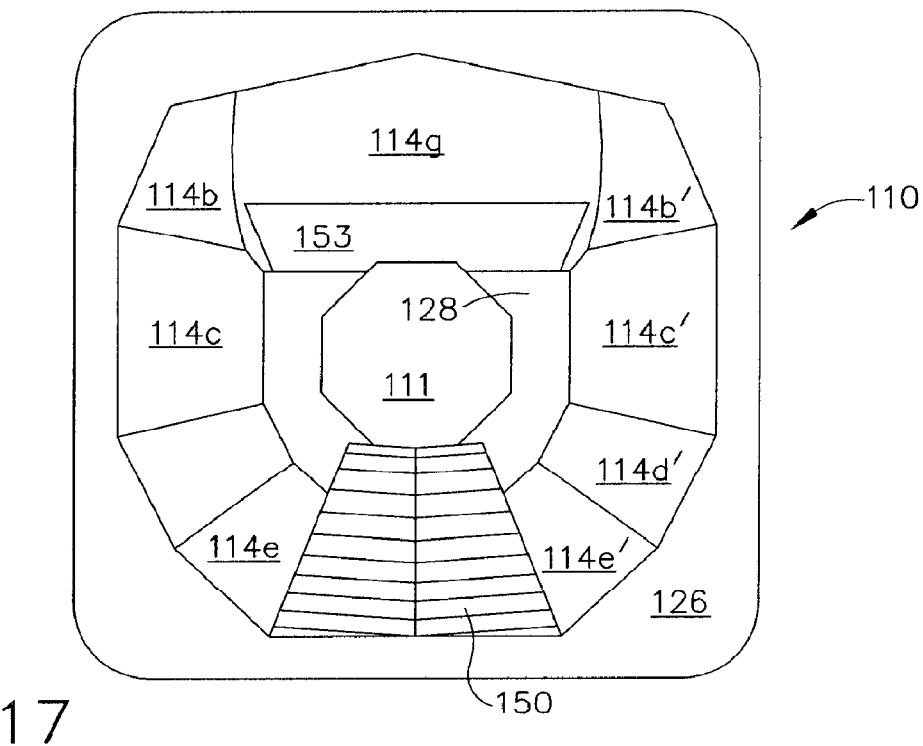
FIG. 17 is a bottom view of the second embodiment of the self-standing reflector.
Figure 18:
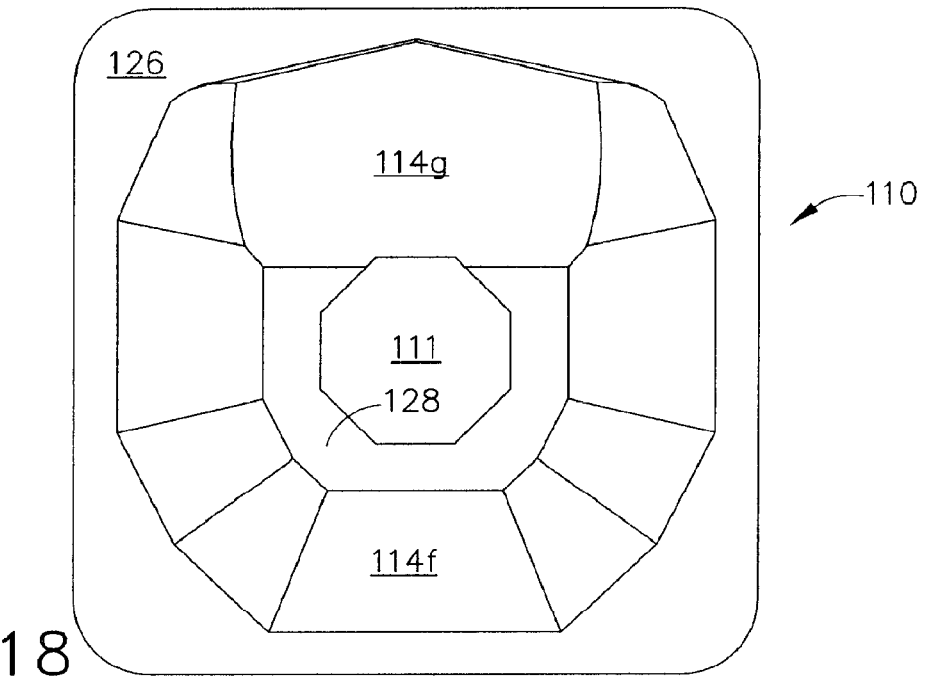
FIG. 18 is a top view of the second embodiment of the self-standing reflector.
Figure 19:
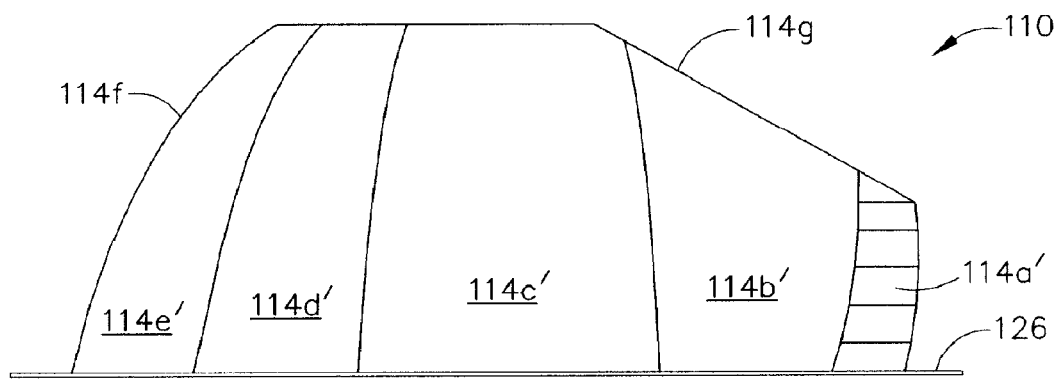
FIG. 19 is a left side view of the second embodiment of the self-standing reflector, the right side view being the mirror image.
Figure 20:
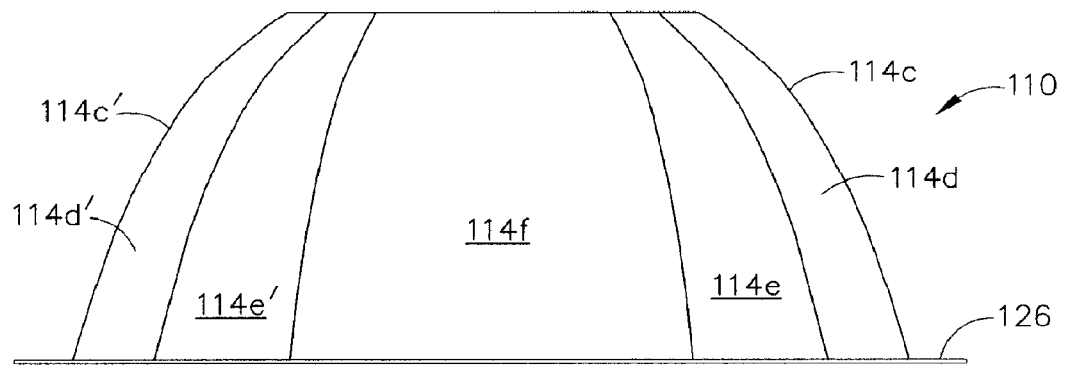
FIG. 20 is a back view of the second embodiment of the self-standing reflector.
Figure 21:
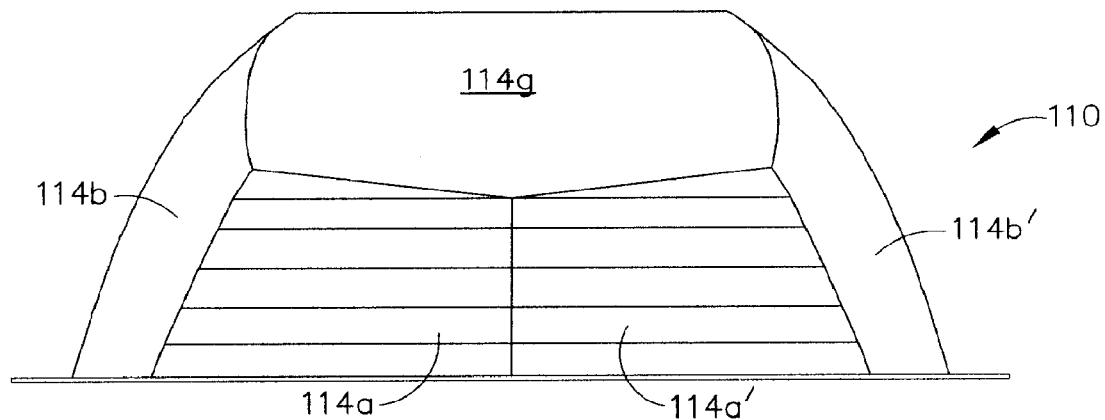
FIG. 21 is front view of the second embodiment of the self-standing reflector.

Additional views of the second embodiment of the reflector 110 include a bottom view FIG. 17, a top view FIG. 18, a side view FIG. 19, a rear view FIG. 20 and a front view FIG. 21.

Either of the illustrated embodiments can comprise a backing member, preferably made of relatively stiff sheet metal and having reflective properties, that is attached or otherwise fastened to a surface of an element of the sheet 122, such as a panel 124 or mounting flange portion 126. The backing member is typically planar and is positioned relative to an element of the sheet 122, such as a panel 124, so that an elongated side edge of the backing member is coincident with a predetermined fold line 136 or 138. The edge of the backing member coincident with a predetermined fold line helps to define a consistent line of bending in the sheet 122. The backing member can be glued, riveted, screwed or attached by any other suitable fastening structure or material to the sheet 122.

While a unitary single sheet of reflective material is preferred for forming self-standing main reflectors in accordance with its principle of the present invention, it is contemplated that two or more sheets of reflective material may be joined together and folded to form a self-standing main reflector as described below.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A self-standing reflector for a luminaire that has a light source securable therein, having an opening through which light from the source is emitted, and comprising:
   a main reflector having an interior reflective surface comprising a plurality of reflector panels retained in a predetermined three-dimensional reflector shape that defines the light emitting opening, the plurality of reflector panels including oppositely-disposed first reflector panels; and
   at least one pair of symmetrical reflective inserts, each reflective insert joined to and disposed inboard from one of the oppositely-disposed first reflector panels, and each of the at least one pair of symmetrical reflective insert having at least one reflecting surface disposed inboard from the interior reflective surface.

2. The self-standing reflector according to claim 1 wherein the main reflector comprises a plurality of folded reflector panels and is formed from at least one sheet of material comprising a plurality of panels that are folded along fold lines pre-formed in the at least one sheet into the folded reflector panels in abutting relationship that define the predetermined three-dimensional reflector shape.

3. The self-standing reflector according to claim 2 wherein at least one of the reflector panels has at least one side edge abutting a side edge of an adjacent folded reflector panel, and wherein the reflector panel has at least a first securement member formed proximate the side edge thereof for engagement with the side edge of the adjacent reflective panel, to retain the main reflector in the predetermined three-dimensional reflector shape.

4. The self-standing reflector according to claim 3 wherein the at least one reflector panel is curved to define a curved portion of the interior reflective surface.

5. The self-standing reflector according to claim 1 wherein each of the at least one pair of reflective inserts comprises a plurality of rows of facets extending along the length dimension of the reflective insert.

6. The self-standing reflector according to claim 1 wherein the at least one pair of symmetrical reflective inserts are affixed proximate a distal end of the reflector panels.

7. The self-standing reflector according to claim 1, wherein the at least one pair of symmetrical reflective inserts further comprising a second pair of reflective inserts disposed inboard oppositely-disposed second reflector panels of the main reflector that are arranged perpendicular to the first reflector panels.

8. The self-standing reflector according to claim 7 wherein the first reflective inserts and the second reflective inserts comprise a plurality of rows of facets extending along the length dimension of the respective reflective inserts.

9. The self-standing reflector according to claim 8 wherein at least one row of facets on the first reflective insert comprises at least two abutting facets oriented transverse to the length dimension, which form an angle of less than 180 degrees.

10. The self-standing reflector according to claim 8 wherein the plurality of facets are concave.

11. The self-standing reflector according to claim 1 wherein the reflective inserts have a smooth curved surface along the length.

12. A method of illuminating an area with an energy-efficient, light-directing reflector luminaire, using less power than with a conventional reflector luminaire, comprising the steps of:
   5) providing a luminaire having a conventional reflector having an inner reflective surface having a reflectance of less than 95% (less than Miro-4), which emits a reference amount of lumens in a circular pattern from a first lamp of X Watts, for illuminating a rectangular target area with a minimum illuminance;
   6) providing an energy-efficient, light-directing reflector comprising a main reflector comprising a plurality of reflector panels forming an inner reflective surface, the plurality of reflector panels including a pair of first reflector panels disposed on opposite sides of the main reflector and a pair of second reflector panels disposed on opposite sides of the main reflector and being perpendicular to the first reflector panels, and a plurality of reflective inserts joined to the interior surface of the main reflector and having a reflecting surface disposed away from the interior reflective surface of the main reflector, the plurality of reflective inserts including a pair of opposed first reflective inserts, each joined to and disposed inboard from one of the first reflector panels and a pair of opposed second reflective inserts, each joined to and disposed inboard from one of the second reflector panels, wherein the surfaces of the reflector panels and the reflecting surfaces of the reflective inserts have a reflectance of at least 95%;
   7) providing a second lamp of about 0.7X to 0.95X Watts; and
   8) replacing the conventional reflector with the energy-efficient, light directing reflector, and replacing the first lamp with the second lamp, and illuminating the rectangular target area,
wherein the rectangular target area is uniformly illuminated with at least the minimum illuminance.

13. The method according to claim 12 wherein the first lamp is 1000 Watts and the second lamp is 750 Watts.

14. A self-standing reflector for a luminaire that has a light source securable therein, having an opening through which light from the source is emitted, and the self-standing reflector consisting of:
   a main reflector having an interior reflective surface consisting of a plurality of folded reflector panels formed from at least one sheet of material, the plurality of folded reflector panels being retained contiguously in a predetermined three-dimensional reflector shape that defines the light emitting opening; and
   at least one reflective insert joined to and overlaying at least one of the plurality of folded reflector panels, the at least one reflective insert having at least one reflecting surface disposed inboard from the interior reflective surface.

15. The self-standing reflector according to claim 14 wherein the contiguously retained plurality of folded reflector panels are in edge-abutting relationship, and each folded reflector panel has at least one side edge abutting a side edge of an adjacent folded reflector panel, and wherein the reflector panel has at least a first securement member formed proximate the side edge thereof for engagement with the side edge of the adjacent reflective panel, to retain the main reflector in the predetermined three-dimensional reflector shape.

16. The self-standing reflector according to claim 15 wherein the plurality of folded reflector panels are curved to define a plurality of curved portions of the interior reflective surface.

17. The self-standing reflector according to claim 14 wherein each reflective insert comprises a plurality of rows of facets extending along the length dimension of the reflective insert.

18. The self-standing reflector according to claim 14 further comprising a second pair of reflective inserts disposed inboard and overlaying oppositely-disposed second reflector panels of the main reflector that are arranged perpendicular to the first reflector panels.

* * * * *

UNITED STATES PATENT AND TRADEMARK OFFICE
CERTIFICATE OF CORRECTION

| | | |
|---|---|---|
| PATENT NO. | : 7,445,363 B2 | Page 1 of 1 |
| APPLICATION NO. | : 11/536308 | |
| DATED | : November 4, 2008 | |
| INVENTOR(S) | : James G. Vanden Eynden | |

It is certified that error appears in the above-identified patent and that said Letters Patent is hereby corrected as shown below:

Column 3, line 21, delete "Micro" and insert --Miro--

Column 11, line 66, delete "lumens"

Claim 12, line 15, delete "5)" and insert --1)--

Claim 12, line 21, delete "6)" and insert --2)--

Claim 12, line 40, delete "7)" and insert --3)--

Claim 12, line 42, delete "8)" and insert --4)--

Signed and Sealed this

Fifth Day of May, 2009

JOHN DOLL
*Acting Director of the United States Patent and Trademark Office*